US012758971B2

(12) United States Patent
Wisinewski et al.

(10) Patent No.: US 12,758,971 B2
(45) Date of Patent: Oct. 13, 2026

(54) MICROFLUIDIC NUCLEOTIDE SYNTHESIZER

(71) Applicant: Lenovo (Singapore) Pte. Ltd., Singapore (SG)

(72) Inventors: Henrique Reis Wisinewski, Butantã (BR); Bruno Ramos, Butantã (BR); Sabrina Esperanca Nunes, Butantã (BR); Ariel Pereira Lima, Butantã (BR); Bruno Marinaro Verona, Butantã (BR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 378 days.

(21) Appl. No.: 18/500,582

(22) Filed: Nov. 2, 2023

(65) Prior Publication Data

US 2025/0144620 A1 May 8, 2025

(51) Int. Cl.
*B01L 3/00* (2006.01)

(52) U.S. Cl.
CPC . *B01L 3/502707* (2013.01); *B01L 2300/0887* (2013.01); *B01L 2400/0487* (2013.01); *B01L 2400/06* (2013.01)

(58) Field of Classification Search
CPC ......... B01L 2200/16; B01L 2300/0867; B01L 2300/0883; B01L 2300/0887; B01L 2400/0487; B01L 2400/06; B01L 3/502707; B01L 3/502715
See application file for complete search history.

(56) References Cited

U.S. PATENT DOCUMENTS

2006/0216812 A1* 9/2006 Okada ............... B01L 3/502715
435/288.5

* cited by examiner

*Primary Examiner* — Jennifer Wecker
*Assistant Examiner* — Jonathan Bortoli
(74) *Attorney, Agent, or Firm* — Schwegman Lundberg & Woessner, P.A.

(57) ABSTRACT

A microfluidic system for performing nucleic acid synthesis includes a microfluidic reactor site. A first reactor site valve is coupled upstream of the reactor site. A second reactor site valve is coupled downstream of the reactor site. The system includes a plurality of microfluidic inlets to couple to multiple pressurized reagent containing chambers. A plurality of reagent valves are coupled to individually control a size of droplets of reagent provided by respective pressurized reagent containing chambers. A pressurized gas source is coupled to propel droplets downstream to the microfluidic reactor site.

10 Claims, 13 Drawing Sheets

MICROFLUIDIC NUCLEOTIDE SYNTHESIZER

BACKGROUND

Conventional nucleotide synthesizers emphasize the ability to manufacture sequences of nucleotides (oligonucleotides) in a pseudo-parallel manner utilizing large volumes of reagent to deliver selected reagents for each added nucleotide. Many such synthesizers utilize a chemical process, referred to as Phosphoramidite chemistry which was developed in the 1980s.

SUMMARY

A microfluidic system for performing nucleic acid synthesis includes a microfluidic reactor site. A first reactor site valve is coupled upstream of the reactor site. A second reactor site valve is coupled downstream of the reactor site. The system includes a plurality of microfluidic inlets to couple to multiple pressurized reagent containing chambers. A plurality of reagent valves are coupled to individually control a size of droplets of reagent provided by respective pressurized reagent containing chambers. A pressurized gas source is coupled to propel droplets downstream to the microfluidic reactor site.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

A microfluidic nucleotide synthesizer integrates a set of microfluidic features, an electronic module for valve control, and a complement of distinct inlets for performing controlled cycles of nucleotide synthesis. Valves in a microfluidic pathway are used to supply a selected amount, a droplet or bolus, of reagents into a micromixer and propel the mixed reagents using pressurized gas onward into a reactor site loaded with proper material for DNA or RNA growth (i.e. a solid substrate with a linker). The selected amount of reagents is based on the size of the reactor site, such as a chamber, to optimize reagent utilization.

The use of microfluidics and gas to propel the droplets into the reactor site enables a great reduction in the amount of reagents used to synthesize nucleotide sequences, such as oligos. Oligos are generally sequences of between 6 and 200 nucleotides, but can be shorter or longer.

Figure 1:
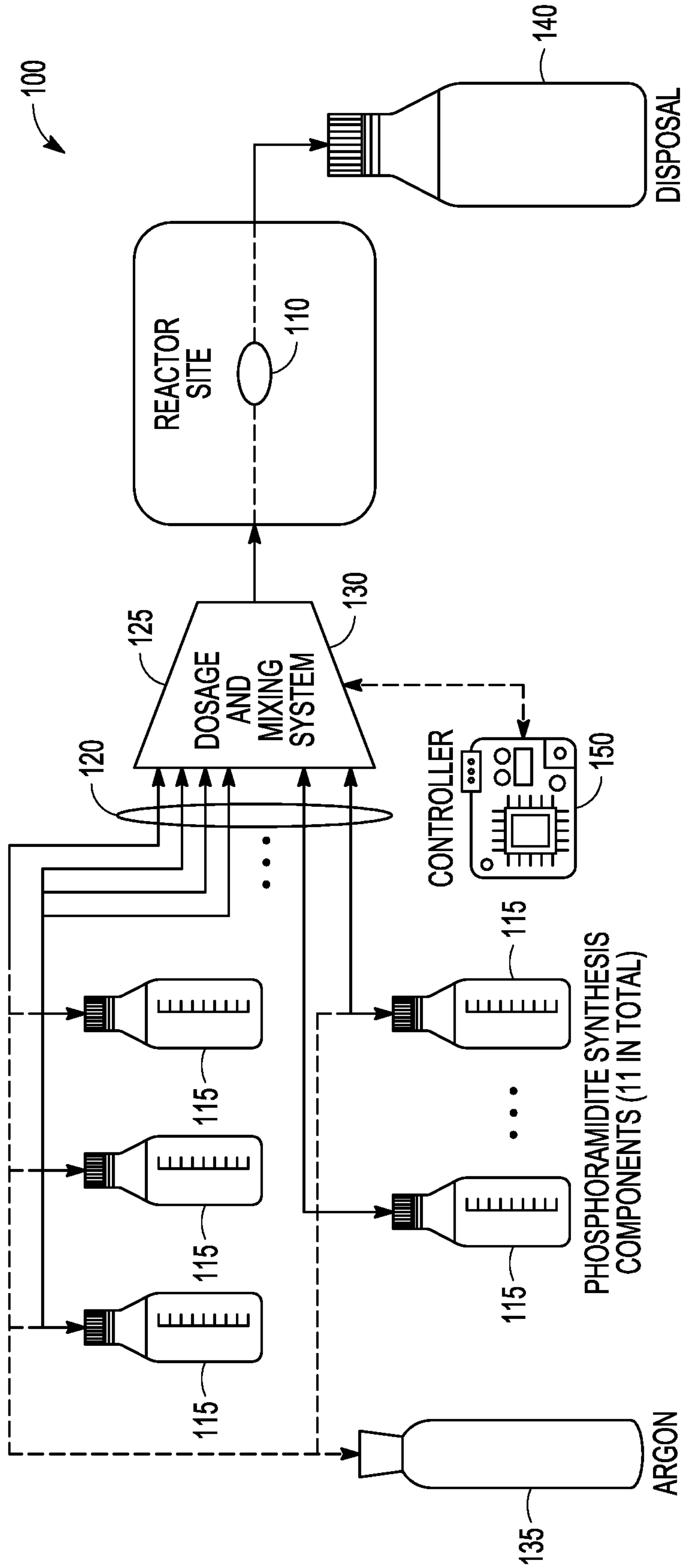
FIG. 1 is a block diagram of a microfluidic nucleotide synthesizer according to an example embodiment.

FIG. 1 is a block diagram of a microfluidic nucleotide synthesizer 100. Synthesizer 100 includes a reactor site 110 for chemical synthesis of nucleotide sequences. In one example, Phosphoramidite chemistry may be used to synthesize nucleotide sequences on linkers within the reactor site 110. Phosporamidite chemistry involves the use of eleven different reagents contained in reagent containers 115 in one example. Reagents may be stored in the reagent containers 115 comprising pressurized bottles or chambers in one example, and coupled via corresponding microfluidic tubing 120 and valves 125 to mixing microfluidics 130.

Mixing microfluidics 130 provides a serpentine microfluidic path to mix reagents and may be coupled to provide the mixed reagents to the reactor site 110. In further examples, the mixed reagents are provided to multiple reactor sites in parallel, also represented by reactor site 110. A pressurized gas container 135 may also be coupled to the microfluidic tubing 120 to propel the reagents to the mixing microfluidics 130, reactor site 110, and a collection container 140 that is coupled to collect reagent and synthesized nucleotide sequences from the reactor site 110. Gas within pressurized gas container 135 may be an dry inert gas, such as Argon or Nitrogen in one example and may be selected to minimally interact with diffuse into reagents.

A controller 150 is coupled to each of the valves. Controller 150 controls a multiplexor comprising valves 125 to deliver droplets from reagent containers 115 to the reactor site 110 in sequence to perform Phosphoramidite chemistry to produce specified nucleotide sequences. In one example, each reagent container 115 may include 200 ml of reagent. Further examples may work with any amount of stored reagent that can kept from degrading.

Controller 150 controls the valves 125 to provide droplets from a selected reagent container 115 and also controls the pressurized gas container 135 to propel the droplets through the mixing microfluidics 130 to the reactor site 110. Each reagent container 115 and pressurized gas container 135 has a separate associated valve in valves 125 to provide a multiplexor function controlled by controller 150. Cleansing solution may also be used between provision of a different droplet or droplets for each base to be added.

Droplet volumes in one example may vary from microliters to milliliters depending on the size of the microfluidic features of synthesizer 100 and in particular the volume of one or more reactor site 110 chambers. Timing may vary depending on the length of microfluidic pathways from the reagent containers to the mixing microfluidics 130 to ensure desired amounts of each reagent enter the mixing microfluidics 130, and suitable mixed, and enter and reactor site 110.

Timed opening and closing of valves may be used to ensure the droplet or droplets reside in the reactor site 110 for addition of each base.

Figure 2:
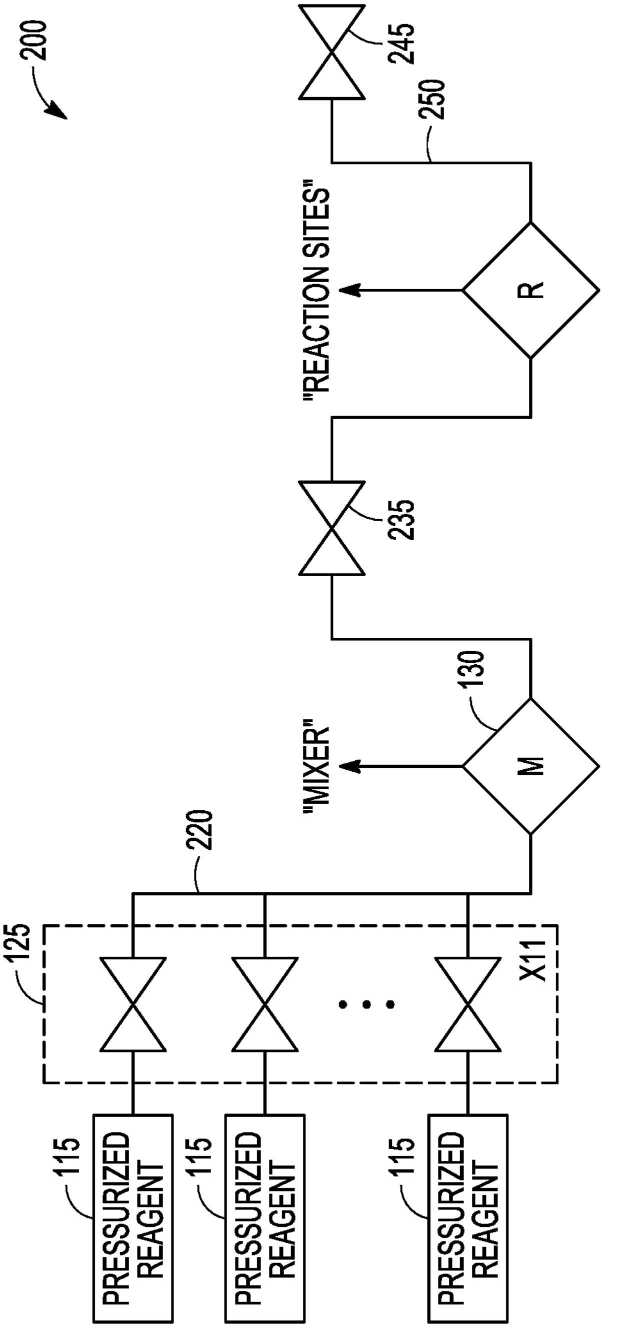
FIG. 2 is a schematic representation of a microfluidic nucleotide synthesizer according to an example embodiment.

FIG. 2 is a schematic representation 200 of microfluidic nucleotide synthesizer 100. Pressurized reagent containers 115 are shown along with corresponding valves 125. Microfluidic tubing or channels 220 couple the reagents to the mixing microfluidics 130. Mixed reagents exit the mixing microfluidics 130 via a microfluidic channel 230 that is coupled via a pre-reactor site valve 235 to the reactor site 110. A post reactor site valve 245 is shown coupled to microfluidics 250 exiting the reactor site 110. Controller 150 also controls the valves 235 and 245 to place the droplets properly within the reactor site 110. In one example valves 125, 235, and 245 may be solenoid microvalves controlled by controller 150. Timed opening and closing of valves 235 and 245 may be used to ensure the droplet or droplets reside in the reactor site 110 for addition of each base. Both valves 235 and 245 may be closed during reaction to add the base.

In one example, eleven valves may be used for individual reagent injections and pressurized gas injection. Additional valves 235 and 245 are positioned on either side of the reactor site 110 for controlling the flow in the microfluidic pathways to ensure the selected amount of reagents resides in the reactor site for the addition of each nucleotide. The pressurized gas from pressurized gas container 135 may also be used to purge reagents following the addition of each nucleotide.

The selected amount of reagents may be referred to as a droplet or bolus of reagents. In one example, the bolus may be slightly larger than an amount desired for desired reactions to occur in one or more reactor sites 110 to account for tolerances in valve control and allow a buffer amount of fluid on either side of the reactor site 110 if desired.

One challenge addressed by the use of microfluidics for nucleotide synthesis is the minimization of reagent consumption. Conventional synthesizers emphasize the ability to manufacture multiple oligos in a pseudo-parallel manner utilizing continuous reagent flow. By using a bolus of reagents and pressurized gas for propelling the bolus through microfluidics, reagent consumption may be drastically reduced for many different methods of DNA synthesis, such as traditional phosphoramidite methods, electrochemical phosphoramidite methods, photochemical methods, and others. In addition, the surface tension of liquid reagents being propelled by pressurized gas in microfluidic paths ensures minimal interaction of the gas with the liquid reagents, as the cross section of the gas/liquid interface is very small.

A further challenge in synthesizing oligos involves obtaining operational efficiency and cost-effectiveness. Contrary to existing synthesizers that focus on providing oligonucleotides to a supply chain, the microfluidic nucleotide synthesizer enhances the end-user's capacity to produce a small volume of oligonucleotides quickly. This feature is particularly relevant for research purposes or other industrial applications, such as the production of primers for polymerase chain reaction. The use of microfluidics enables shorter path lengths, faster valve response, and higher propelling gas pressures, resulting in decreased production times. Production times may be further optimized by adjusting injection, washing, and drying sub-cycles.

In one example, the reactor site 110 may be formed of biocompatible materials suitable for the purpose of the respective components. Plates used to form the reactor site 110 may be constructed of a glass ceramic substrate, such as a Low Temperature Co-Fired Ceramic (LTCC) forming a multilayer microfluidic device that may have multiple reactor sites 110 for chemical-based manufacturing of genetic material and/or nucleic acid for data storage or biological applications. LTCC also provide a suitable base for electronic components and electrodes, allowing integration of many of the elements of synthesizer 100 on one or more substrates. Other suitable materials include polymers such as cyclic olefin copolymer (COC) which is an amorphous polymer, polypropylene, polycarbonate, or polyethylene provided they can maintain integrity at desired process temperatures and in light of various reagents utilized. Glass and Silicon, as well as other bio compatible materials, may also be used to build multi-layer microfluidics.

The substrate in one example may include the valves 125, 235, 245, mixing microfluidics 130, controller 150, and reactor site 110, as well as microfluidic paths coupling such elements. In further examples some components may be formed separately from the substrate. For example, the reagent containers 115 may be coupled to the substrate microfluidic paths via microfluidic tubing, having a similar cross section and flowrate as the microfluidic paths. Such a consistent cross section enables better control of droplet size and position within the microfluidic features. In one example, the paths comprise 100 um width channels. Channels on the mixing microfluidics 130 and microfluidic paths may range from 20 to 400 um in width in one example. With ceramic material, path widths may range from 50 to 265 um. Different widths may be used in various further examples. Microfluidic tubing typically ranges from 1/64 inches to 1/8 inches, with less than 1 mm internal diameter.

In some examples, the shape of the reactor site 110 may be designed to facilitate uniform distribution of the mixed reagents. In one example, the reactor site 110 is a chamber having an oval or elliptical in shape.

Reactor site 110 may be formed with multiple layers of LTCC in one example. The height of the reactor site 110 in one example is 1.96 mm (which is equivalent to seven layers of 265 um thick LTCC and two layers of 50 um thick LTCC. The size of the reactor site 110 is large in one example to enable working with a commercial substrate for DNA synthesis. Working with other materials, like PANI as a linker, would enable the use of smaller reactor sites.

In one example method, each layer (a sheet or plate) of LTCC (or other suitable material for forming microfluidics) is cut using a laser. The cut LTCC layers may be in the form of a tape, and are stacked together and laminated, with controlled temperature and pressure to form the microfluidic plate. Subsequently, the microfluidic plate is sintered in an oxidizing atmosphere at 850° C. following a pre-established heating ramp. Glass paste or other adhesive may be used to bond the plate to other materials, such as PDMS. In further examples, the use of highly polished surfaces may provide sufficient binding.

In one example, the reactor site 110 may have a design point based on a solution volume of 20 ul. Given that design point, the reactor site 110 may have a height of approximately 1.70 mm for two or more reasons: (a) cylindrical or oval chamber may help ensure that initiator particles are concentrated in the central region of the reactor site; and the height of 1.70 mm to (b) guarantee the volume described above (and avoid waste of reagents), and (c) prevent PDMS (polydimethylsiloxane) which may optionally be used to seal the reactor site if needed for a particular linker from entering the chamber. This would result in an absorption of reagents and decrease in useful volume of the reactor site. In one example, the reactor site as a width of approximately 2.6 mm and a length of approximately 4.6 mm.

In one example, input channel width may be 0.3 mm and the output channel may have a width of 0.50 mm. Dimensions of all components may vary based on different design points, including fluid flow rates, reactor site size, and initiator particle size.

Figure 3:
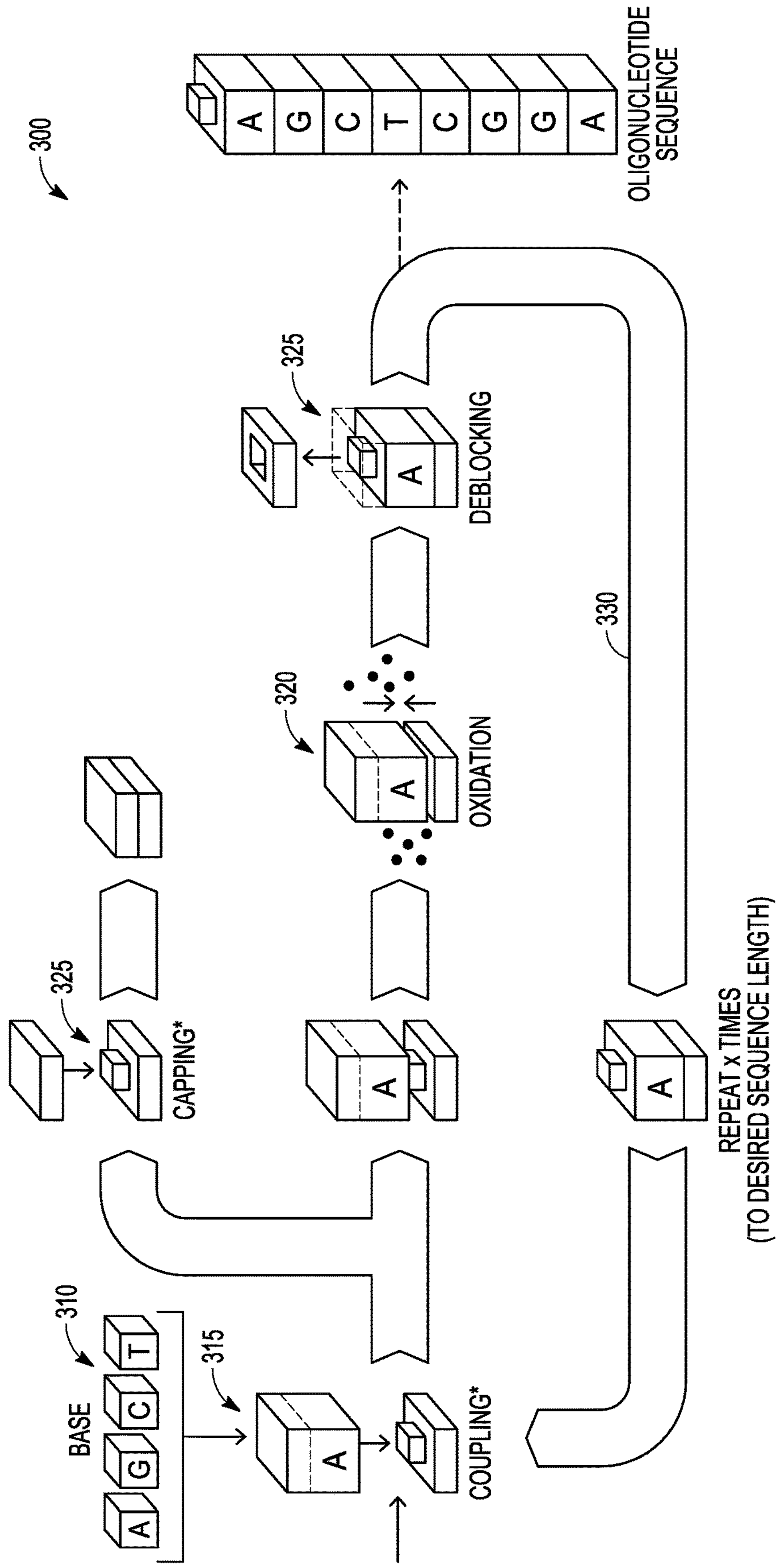
FIG. 3 is a flow diagram illustrating a chemical process of building oligonucleotides according to an example embodiment.

FIG. 3 is a flow diagram illustrating a chemical process 300 of building oligonucleotides. In short terms, a cyclic reaction in which a new "blocked" nucleotide 310 is selected and coupled at 315. Oxidation is then performed at 320 followed by deblocking at 325. Following deblocking 325, the process may be repeated as shown at 330 a desired number of time. Process 300 is a cyclic reaction with a total of 11 fluids. At least two of the steps, coupling and a final capping 335 step utilizing multiple reagents that are mixed via mixing microfluidics 130. Each different base, A, G, C, and T may also utilize different reagents in the well-known Phosphoramidite chemical method. Once a desired length of has been obtained, cleavage may be performed to release the oligo from the reactor site for use as data storage or one or more biological processes.

Figure 4:
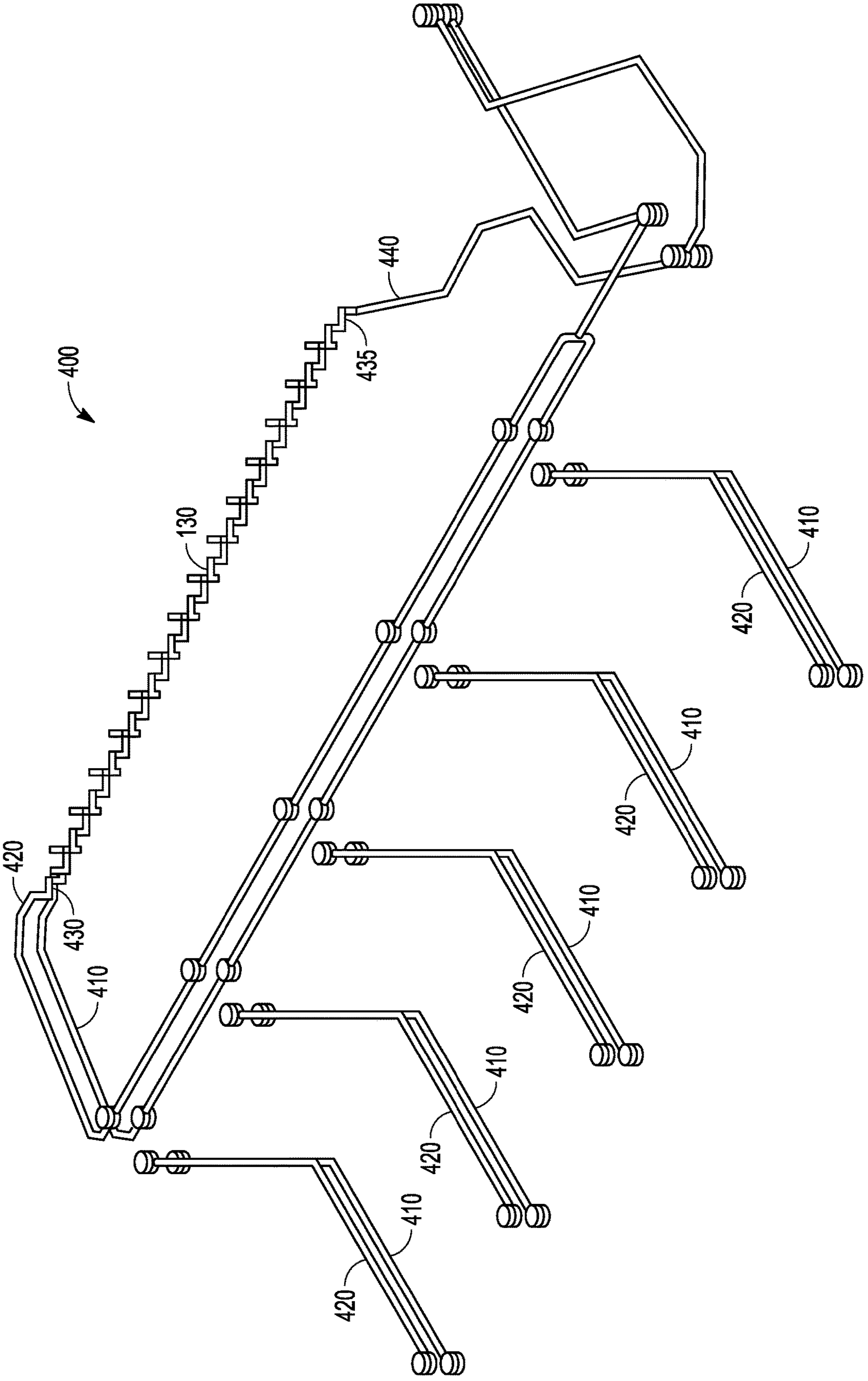
FIG. 4 is an isometric perspective representation of microfluidics for mixing reagents according to an example embodiment.

FIG. 4 is an isometric perspective representation of microfluidics 400 for mixing reagents. Microfluidics 400 includes mixing microfluidics 130 shown as a serpentine structure including many successive right angle turns designed to mix droplets of two or more reagents being propelled downstream by compressed gas. Droplets may be provided by one or more reagent channels 410 and 420. Additional reagent channels may be used in further examples. Pressurized gas may also be provided to propel the reagents through channels 410 and 420. The reagent channels 410 and 420 meet at an upstream end 430 of mixing microfluidics 130 and continue on via exit microfluidic channel 440 at a downstream end 435 of mixing microfluidics 130. Exit microfluidic channel 440 is coupled to the reactor site 110, not shown.

Figure 5:
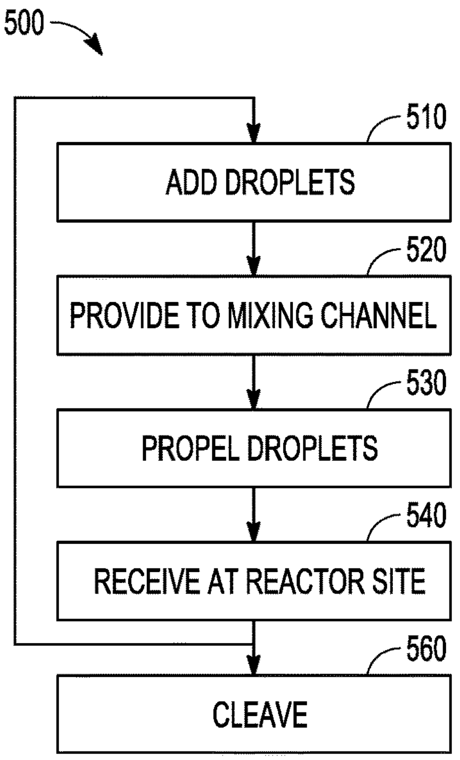
FIG. 5 is a flowchart illustrating a computer-controlled method of synthesizing nucleic acid sequences utilizing microfluidic structures according to an example embodiment.

FIG. 5 is a flowchart illustrating a computer-controlled method 500 of synthesizing nucleic acid sequences utilizing microfluidic structures. Method 500 begins at operation 510 by adding droplets of synthesis reagents to a microfluidic device for adding a nucleic acid base to a nucleic acid sequence. Operation 520 controls valves to provide the droplets of synthesis reagents to a mixing channel of the microfluidic device. Operation 530 propels the droplets via controlling a pressurized gas source. Operation 540 receives homogenized droplets of synthesis reagents in a reactor site of the microfluidic device to synthesize add a selected base to a sequence. Operations 510, 520, 530, and 540 are repeated as shown at 550 until a desired number of bases are added to the sequence. The sequence may be cleaved and released from the reactor site at operation 560.

Figure 6:
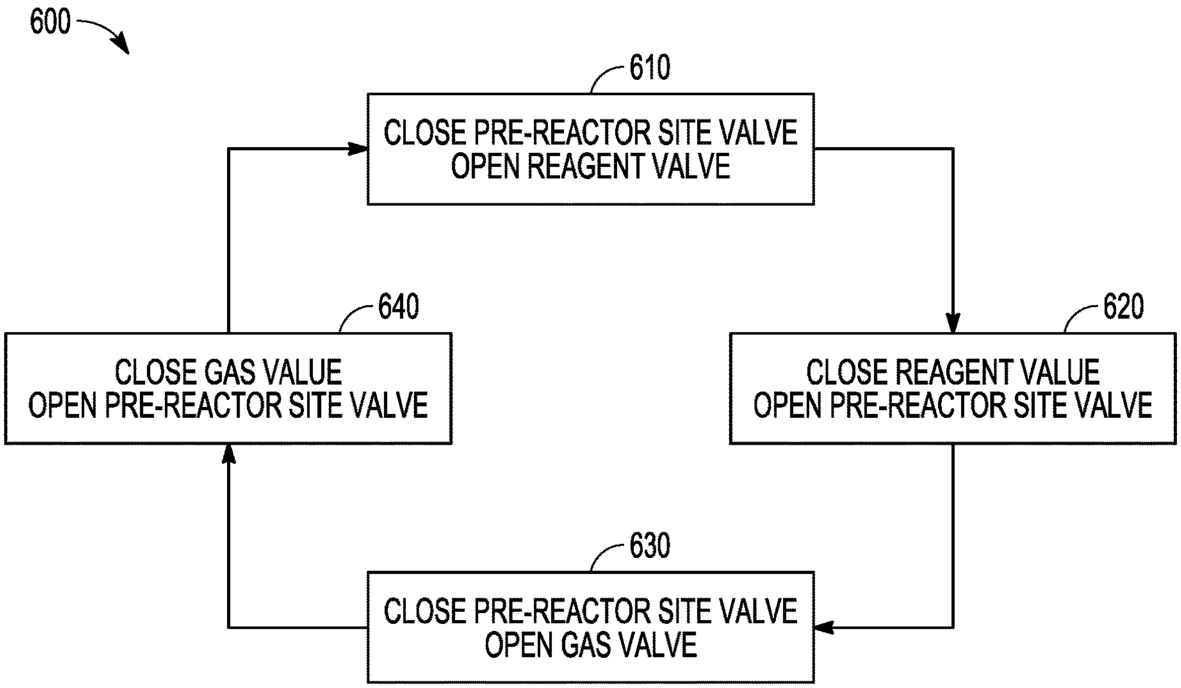
FIG. 6 is a flow diagram illustrating a droplet injection sub-cycle 600 to add a droplet of a selected reagent according to an example embodiment.

FIG. 6 is a flow diagram illustrating a droplet injection sub-cycle 600 to add a droplet of a selected reagent in accordance with operation 500. Sub-cycle 600 begins at operation 610 by closing the pre-reactor site valve 235 and opening a corresponding reagent valve in valves 125 for a period of time corresponding to a selected sub-cycle period. The period of time may be selected to provide a suitable droplet of reagent to facilitate DNA synthesis in the reactor site 110. Operation 620 closes the reagent valve and opens the pre-reactor site valve 235. Operation 630 closes the pre-reactor site valve and opens the gas valve corresponding to pressurized gas container 135. Operation 640 Closes the gas valve and opens the pre-reactor site valve 235.

FIGS. 7A, 7B, 7C, 7D, 7E, and 7F are timing diagrams 700 illustrating how to inject multiple droplets of a same reagent. The timing diagrams show times denoted by $t_0$, $t_1$, $t_2$, . . . $t_{11}$ that show time periods during which different valves are on to provide multiple droplets over time, with each droplet produced during an injection sub-cycle. Some of the timing diagrams also illustrate progression of the droplet through microfluidics referenced at 710 and having reference numbers for components that are the same as used in previous figures where such components appear.

Figure 7A:
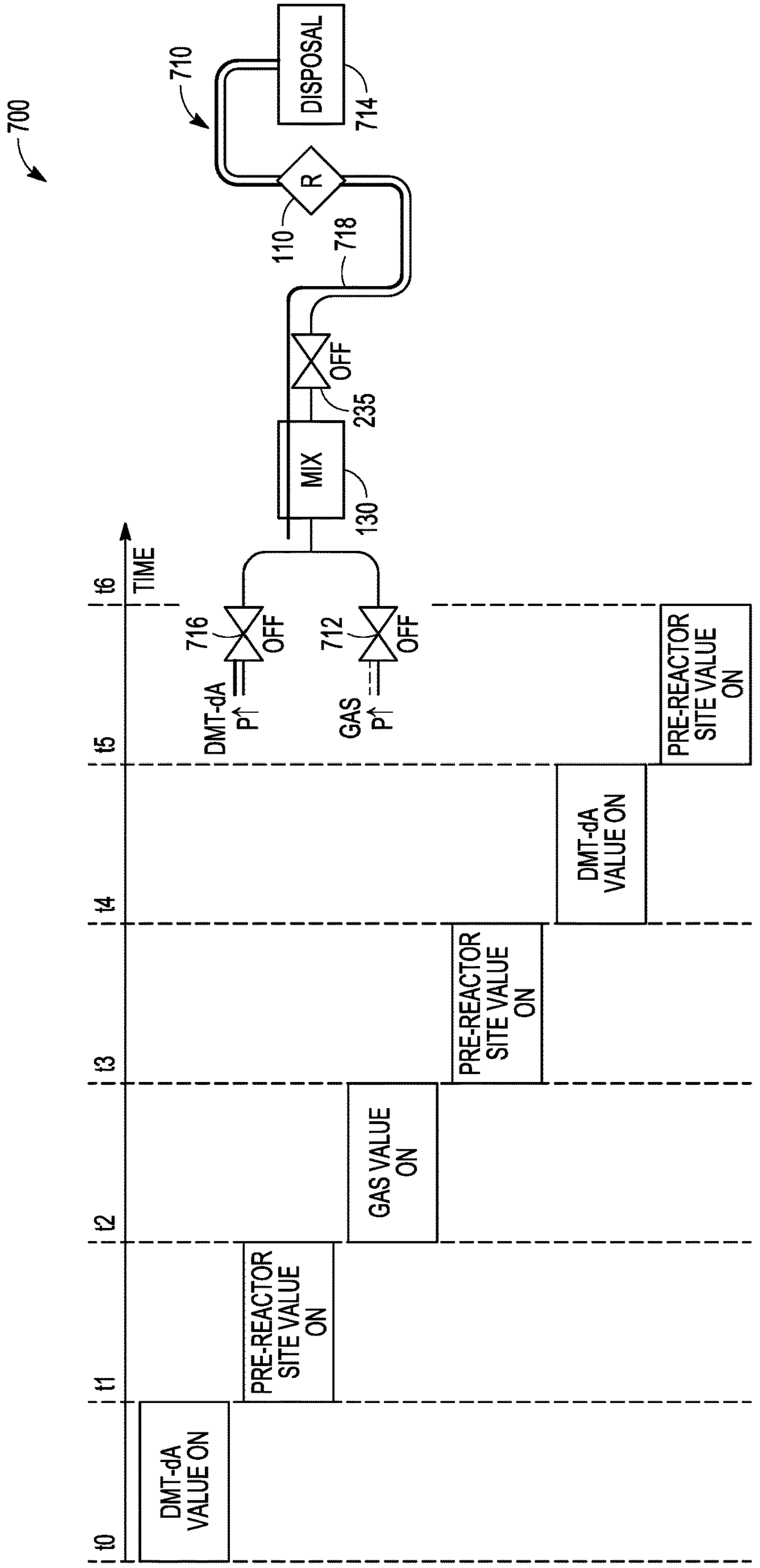
FIGS. 7A, 7B, 7C, 7D, 7E, and 7F are timing diagrams illustrating how to inject multiple droplets of a same reagent according to an example embodiment.

In FIG. 7A, prior to time t0, the microfluidics have been completely dried by letting gas flow via a gas flow valve 712 from pressurized gas container 135 for one or two seconds with pre-reaction site valve 235 and post-reaction site valve 245 open. The gas flow is indicated by line 714, proceeding through the microfluidics to disposal 714. Note that post-reaction site valve 245 functions more as a pressure relief valve and may be optional. A reagent, such as amidite, for example, DMT-dA has a corresponding valve 716, which is closed during the gas flow.

Figure 7B:
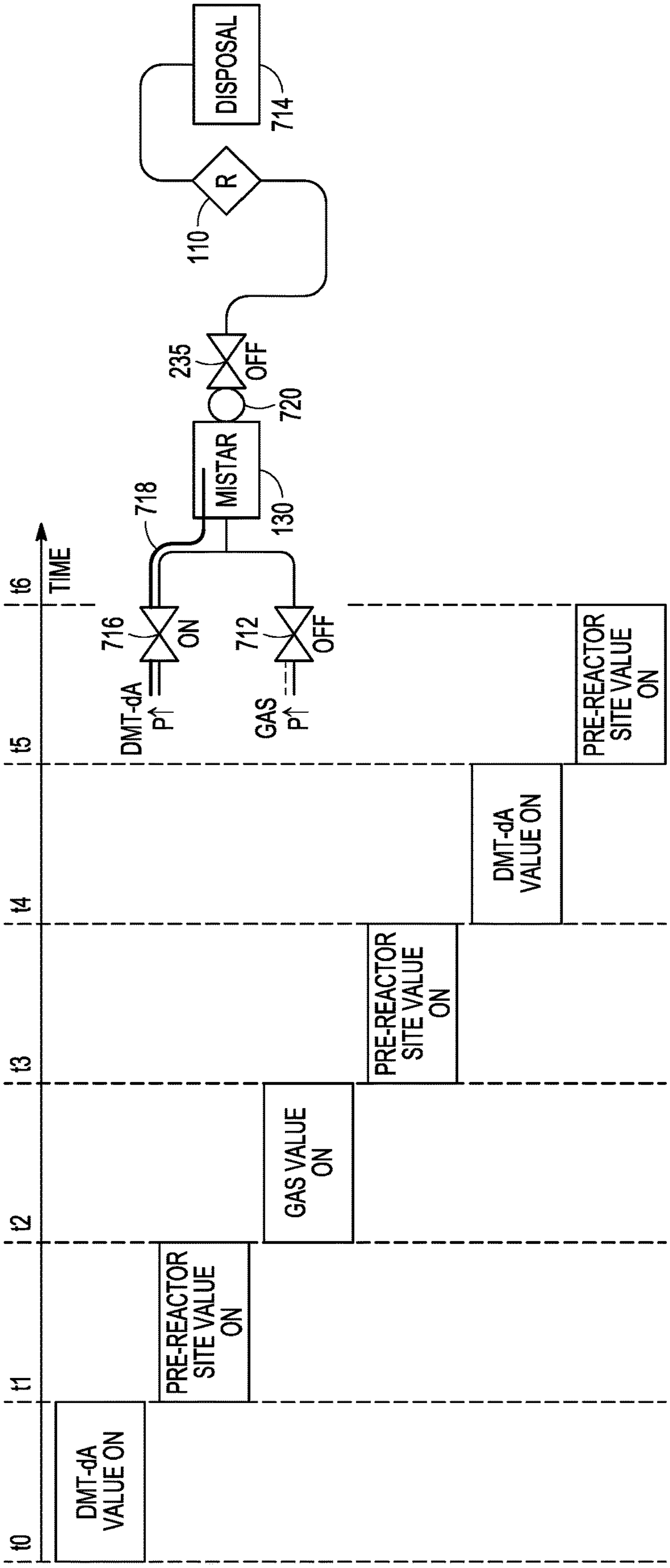

At a period $t_0$ to $t_1$, as shown in FIG. 7B, gas flow valve 712 is turned off and valve 716 is turned on. A small amount of DMT-dA may enter mixing microfluidics 130 before pressure in the microfluidics stabilizes. At the end of $t_1$, a first DMT-dA droplet 718 is shown along with an air bubble 720 at a leading edge of the droplet 718.

Figure 7C:
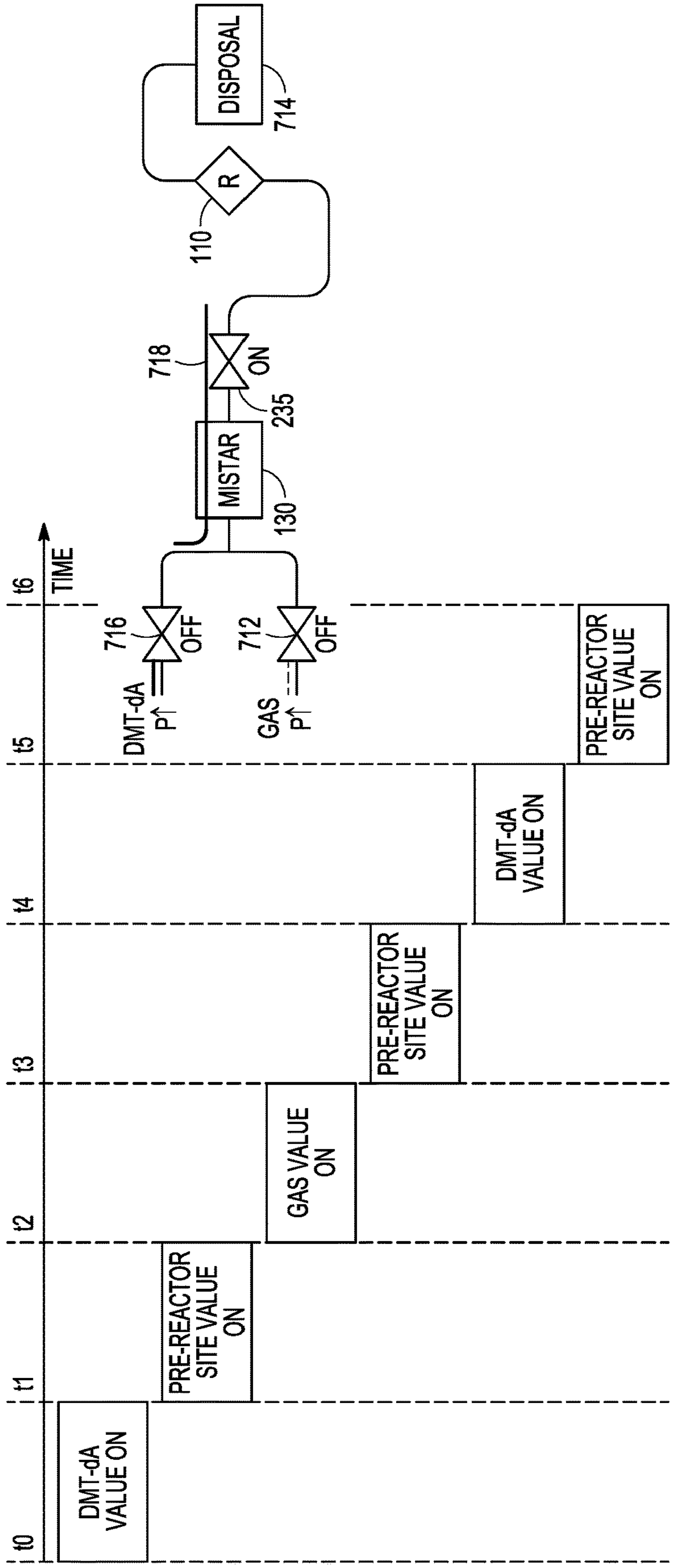

FIG. 7C shows a time period $t_1$-$t_2$. During this period, the pre-reactor site valve 235 is open. The droplet 718 is shown progressing through the pre-reactor site valve 235 toward the reactor site 110, as the microfluidics are still pressurized.

Figure 7D:
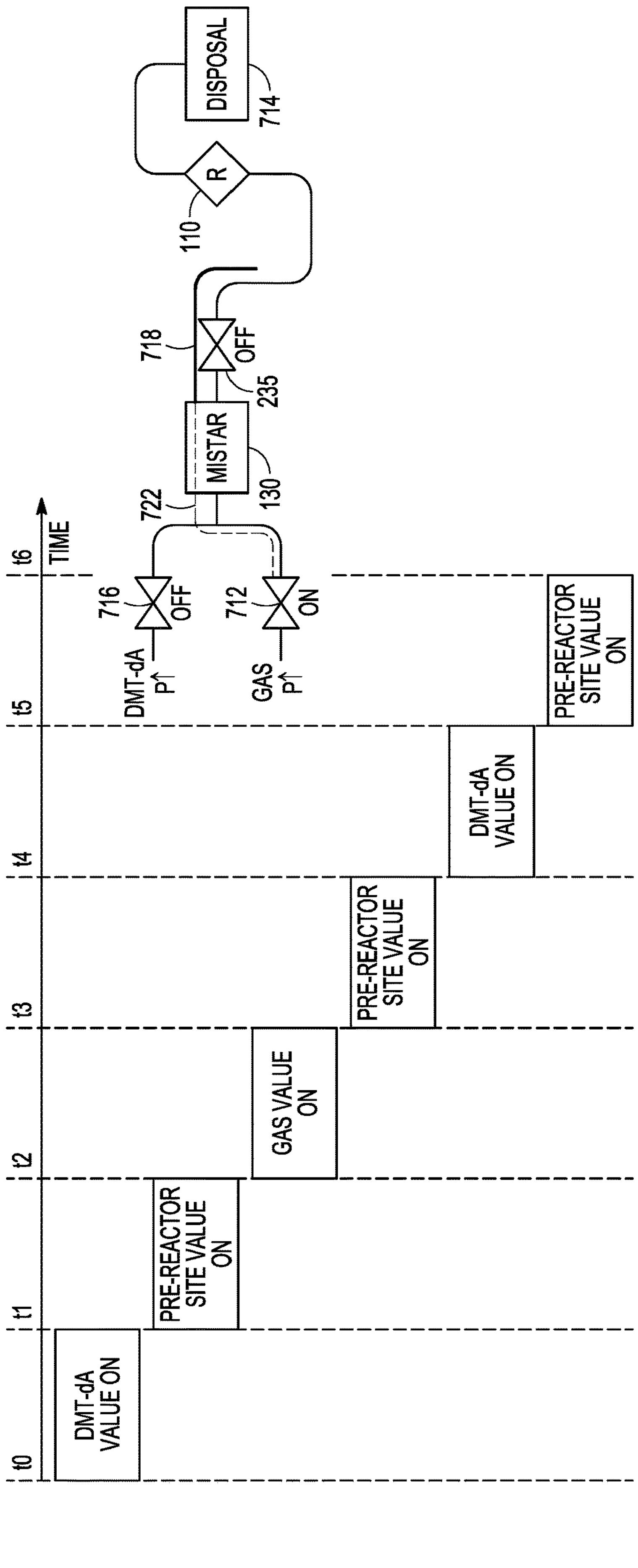

FIG. 7D shows a time period $t_2$-$t_3$. During this period, the pressurized gas valve 712 is on and DMT-dA valve 716 is off. A air bubble 722 is shown upstream of the droplet 718 and is moving droplet 718 further toward the reaction chamber 110.

Figure 7E:
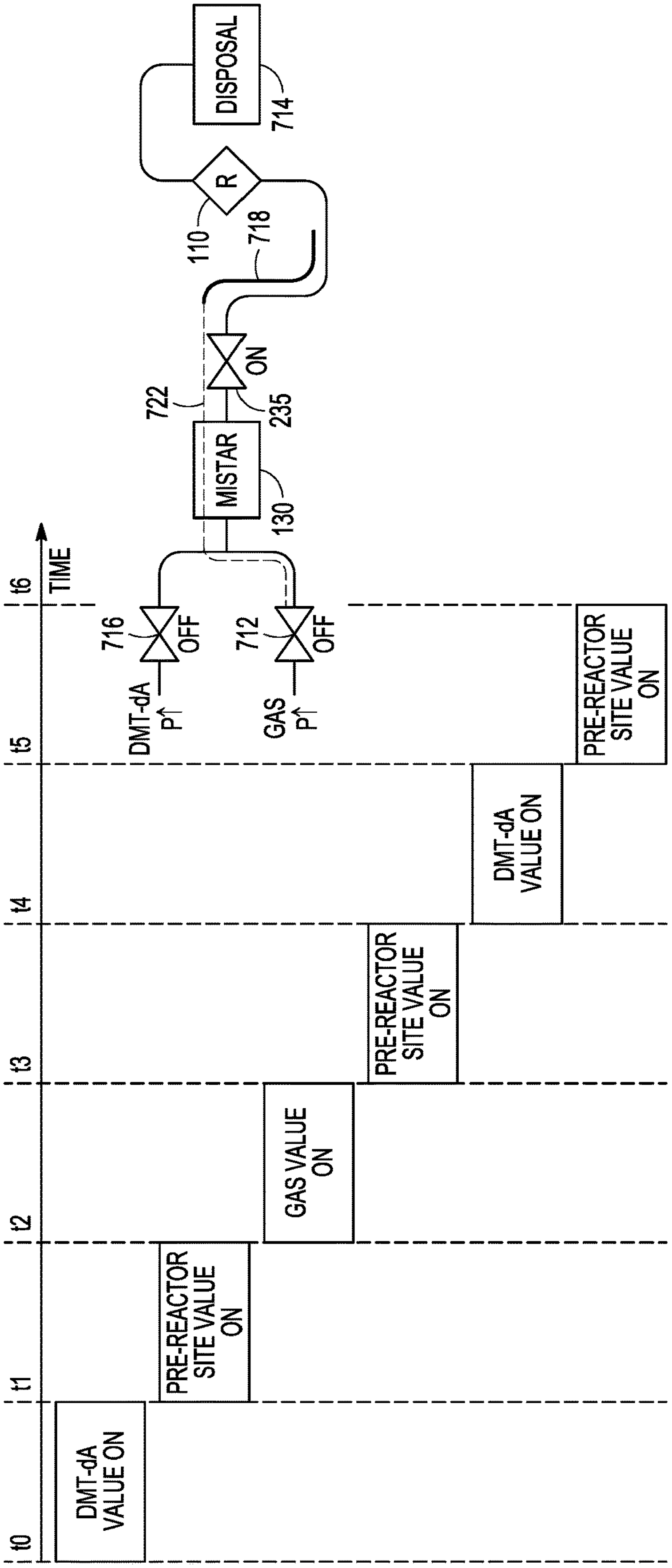

FIG. 7E shows a time period $t_3$-$t_4$. During this period, both the DMT-dA valve 716 and pressurized gas container valve 710 are off. The pre-reactor site valve 235 is open. The droplet 718 is shown as progressing closer to the reaction chamber 130, being pushed by the air bubble 722, which is still pressurized. At this point, the mixing microfluidics 130 contain only gas at ambient pressure, a state in which a further droplet injection cycle may be performed.

Figure 7F:
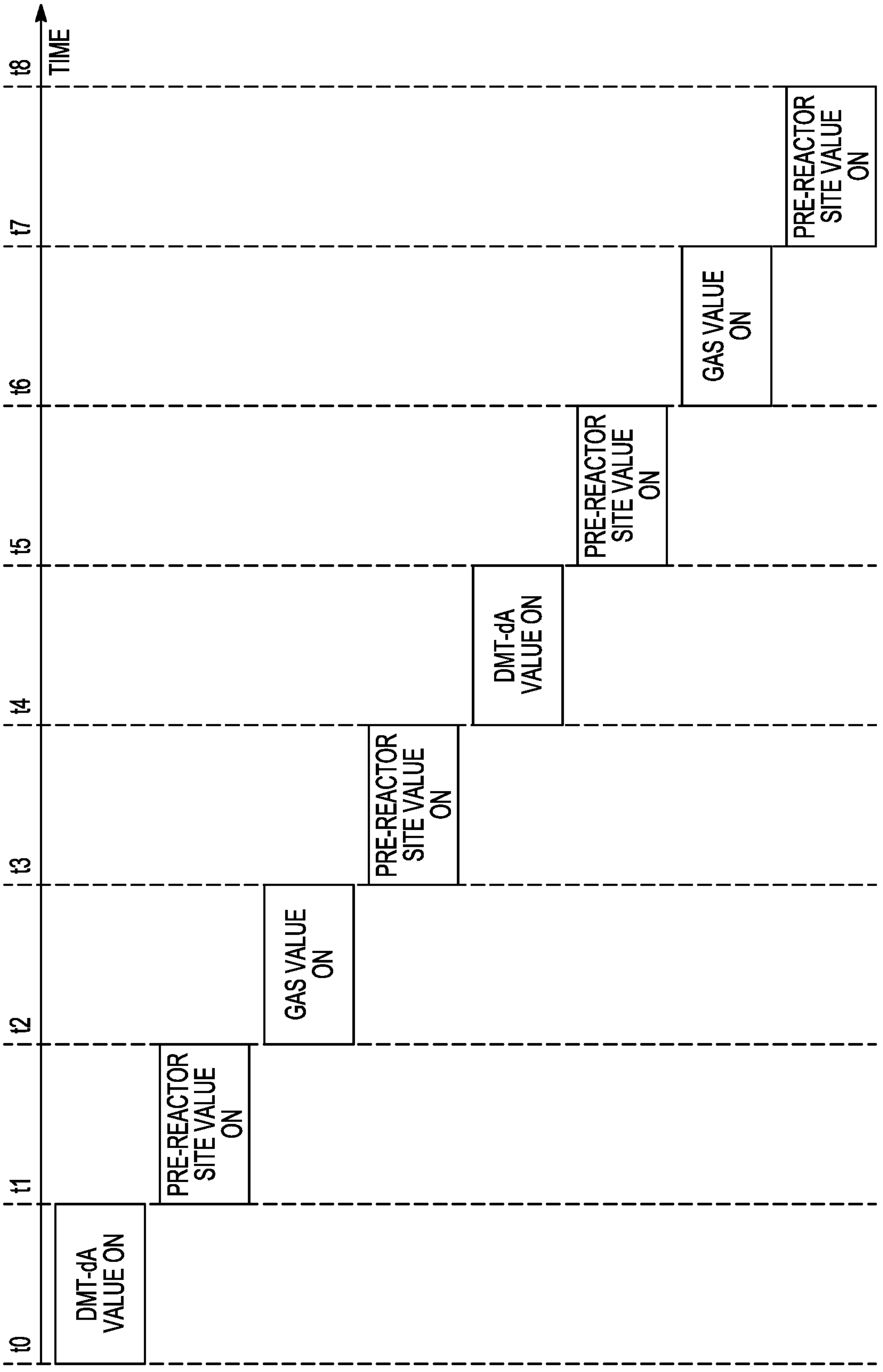

FIG. 7F illustrates a further droplet injection cycle at times $t_4$-$t_8$, which may be performed in the same manner as the first droplet injection cycle. Repeating droplet injection cycles results with alternating droplets of reagent and bubbles of gas that will accumulate within the reaction chamber 110, which is designed to accumulate the reagent while allowing gas to pass. This may be done by providing the microfluidics 250 exiting the reactor site 110 at a higher level than the resulting reagent accumulated in the reactor site 110 chamber.

Figure 8:
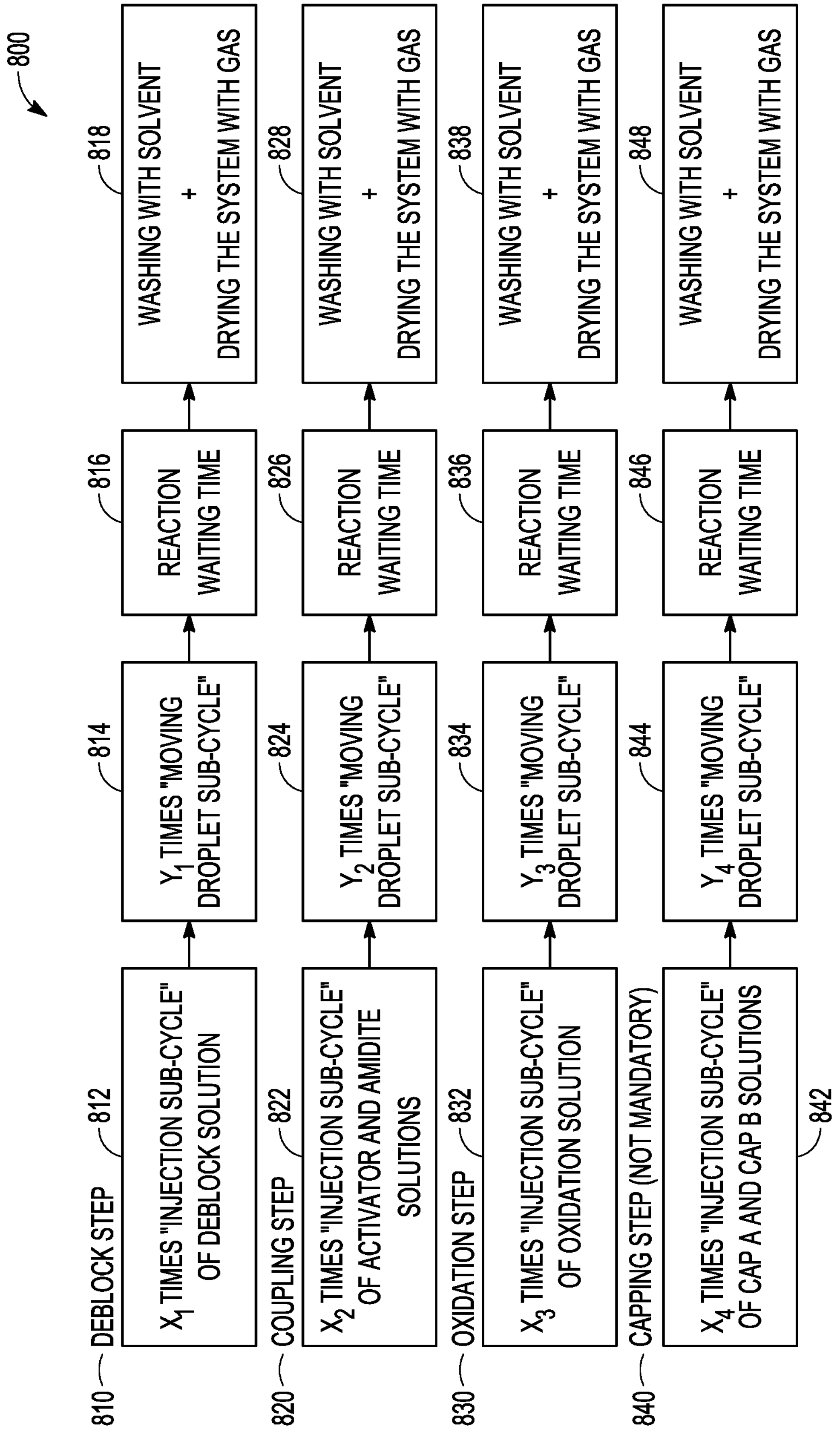
FIG. 8 is a flow diagram illustrating synthesis steps according to an example embodiment.

FIG. 8 is a flow diagram illustrating synthesis steps generally at 800. The synthesis steps include a deblock step 810, coupling step 820, oxidation step 830, and capping step 840, which is optional.

In FIG. 8, an "X" is a number that refers to the number of sub-cycle injections of reagent solutions. "Y" is a number that refers to injections of gas to move droplets produced by sub-cycle injections of reagent solutions. In one example, three sub-cycles provides sufficient volumes of reagents for synthesis. The number of sub-cycles may vary depending on lengths of microfluidics and the volume of droplet produced in each sub-cycle.

Deblock step 810 includes X1 injection sub-cycles of Deblock solution at 812 followed by Y1 air bubbles, referred to as moving droplet sub-cycles at 814. Reaction time waiting follows at 816, which is followed by washing with solvent and drying with gas at 818.

Coupling step 820 includes X2 injection sub-cycles of Activator and Amidite solutions at 822 followed by Y2 air bubbles, referred to as moving droplet sub-cycles at 824. Reaction time waiting follows at 826, which is followed by washing with solvent and drying with gas at 828.

Oxidation step 830 includes X3 injection sub-cycles of Oxidation solution at 832 followed by Y3 air bubbles, referred to as moving droplet sub-cycles at 834. Reaction time waiting follows at 816, which is followed by washing with solvent and drying with gas at 838.

Capping step 840 may follow and includes X4 injection sub-cycles of Cap A and Cap B solution at 842 followed by Y4 air bubbles, referred to as moving droplet sub-cycles at 844. Reaction time waiting follows at 816, which is followed by washing with solvent and drying with gas at 848.

Figure 9:
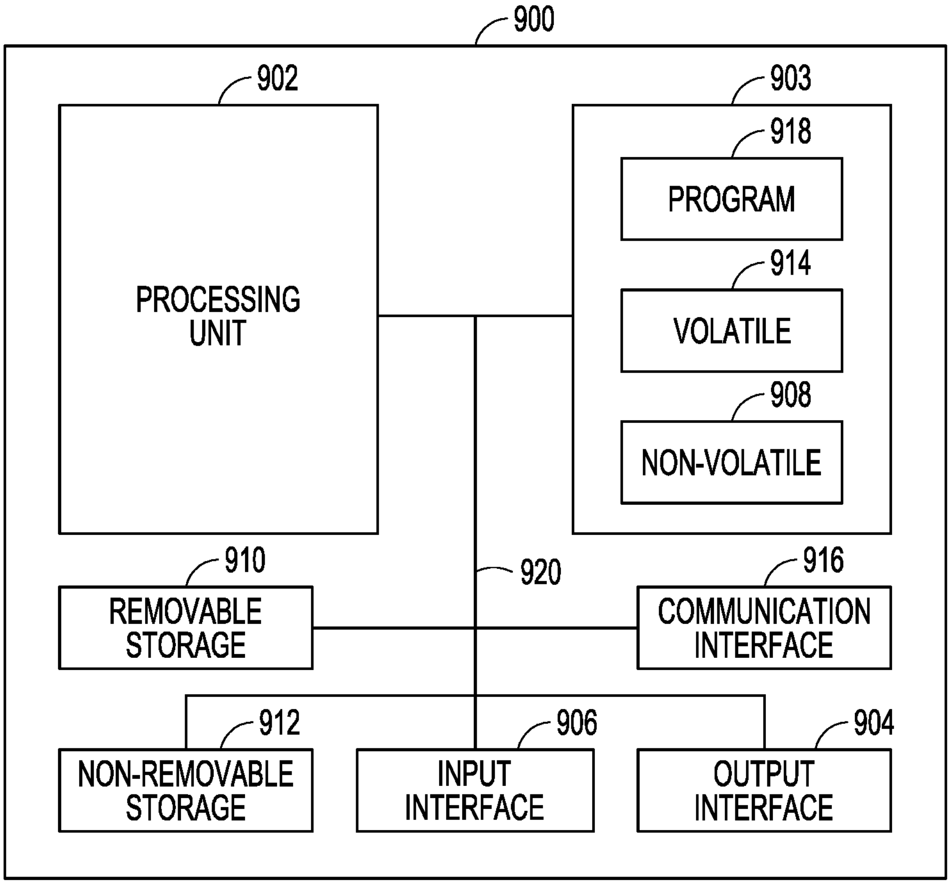
FIG. 9 is a block schematic diagram of a computer system to implement one or more example embodiments.

FIG. 9 is a block schematic diagram of a computer system 900 to implement controller 150 to control valves for synthesizing nucleic acid sequences and for performing methods and algorithms according to example embodiments. All components need not be used in various embodiments.

One example computing device in the form of a computer 900 may include a processing unit 902, memory 903, removable storage 910, and non-removable storage 912. Although the example computing device is illustrated and described as computer 900, the computing device may be in different forms in different embodiments. For example, the computing device may instead be a smartphone, a tablet, smartwatch, smart storage device (SSD), or other computing device including the same or similar elements as illustrated and described with regard to FIG. 9. Devices, such as smartphones, tablets, and smartwatches, are generally collectively referred to as mobile devices or user equipment.

Although the various data storage elements are illustrated as part of the computer 900, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 903 may include volatile memory 914 and non-volatile memory 908. Computer 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 900 may include or have access to a computing environment that includes input interface 906, output interface 904, and a communication interface 916. Output interface 904 may include a display device, such as a touchscreen, that also may serve as an input device. The input interface 906 may include one or more of a touchscreen, touchpad, mouse, keyboard, camera, one or more device-specific buttons, one or more sensors integrated within or coupled via wired or wireless data connections to the computer 900, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 900 are connected with a system bus 920.

Computer-readable instructions stored on a computer-readable medium are executable by the processing unit 902 of the computer 900, such as a program 918. The program 918 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 918 along with the workspace manager 922 may be used to cause processing unit 902 to perform one or more methods or algorithms described herein.

Examples

1. A microfluidic system for performing nucleic acid synthesis includes a microfluidic reactor site. A first reactor site valve is coupled upstream of the reactor site. A second reactor site valve is coupled downstream of the reactor site. The system includes a plurality of microfluidic inlets to couple to multiple pressurized reagent containing chambers. A plurality of reagent valves are coupled to individually control a size of droplets of reagent provided by respective pressurized reagent containing chambers. A pressurized gas source is coupled to propel droplets downstream to the microfluidic reactor site.

2. The system of example 1 and further including a mixing microfluidic channel coupled upstream from the reactor site to receive reagents and provide mixed reagents to the reactor site.

3. The system of example 2 wherein the reactor site and mixing microfluidic channel are formed of multiple laminated ceramic sheets.

4. The system of any of examples 1-2 wherein the reactor site is formed of multiple laminated ceramic sheets.

5. The system of example 3 wherein the laminated ceramic sheets comprise laser etched and stacked Low Temperature Co-Fired Ceramic (LTCC) plates.

6. The system of any of examples 1-5 and further comprising a controller coupled to control the reagent valves to control reagent droplet size.

7. The system of example 6 wherein the controller is further coupled to control flow of gas from the pressurized gas source.

8. The system of example 7 wherein the pressurized gas source includes a dry inert gas at a pressure of at least twice atmospheric pressure.

9. The system of any of examples 1-8 wherein the reactor site is a chamber that is elliptical in shape having a long axis and a short axis.

10. The system of example 9 wherein the reaction chamber includes an input and a first output disposed on opposite sides of the long axis.

11. A microfluidic system for performing nucleic acid synthesis including a microfluidic reactor site having an input to receive chemical synthesis reagents, a valve multiplexor having multiple reagent inputs to couple to multiple reagent containers to provide the synthesis reagents to the microfluidic reactor site and to selectively receive pressurized gas, and a controller coupled to the valve multiplexor to sequentially control the valve multiplexor to provide selected synthesis reagent droplets propelled by the pressurized gas the microfluidic reactor site to synthesize nucleic acid sequences.

12. The microfluidic system of example 11 and further including a mixing microfluidic channel coupled upstream from the reactor site to receive reagents and provide mixed reagents to the reactor site.

13. The system of example 12 wherein the reactor site and mixing microfluidic channel are formed of multiple laminated ceramic sheets.

14. The system of any of examples 11-13 wherein the reactor site is formed of multiple laminated ceramic sheets.

15. The system of example 13 wherein the limited ceramic sheets includes laser etched and stacked Low Temperature Co-Fired Ceramic (LTCC) plates.

16. The system of any of examples 11-15 and further including a controller coupled to control the reagent valves to control reagent droplet size.

17. The system of example 16 wherein the controller is further coupled to control flow of the pressurized gas from the pressurized gas source.

18. The system of example 17 wherein the pressurized gas source comprises a dry inert gas at a pressure of at least twice atmospheric pressure.

19. The system of any of examples 11-18 wherein the reactor site is elliptical in shape having a long axis and a short axis.

20. A method of synthesizing nucleic acid sequences includes A adding droplets of synthesis reagents to a microfluidic device for adding a nucleic acid base to a nucleic acid sequence, B controlling valves to provide the droplets of synthesis reagents to a mixing channel of the microfluidic device, C propelling the droplets via a pressurized gas source, D receiving homogenized droplets of synthesis reagents in a reactor site of the microfluidic device to synthesize add a selected base to a sequence, and F repeating steps A, B, C, and D for multiple different combinations of droplets of synthesis reagents to form multiple bases.

In the methods described herein, the acts can be carried out in any order without departing from the principles of the invention, except when a temporal or operational sequence is explicitly recited. Furthermore, specified acts can be carried out concurrently unless explicit example language recites that they be carried out separately. For example, a claimed act of doing X and a claimed act of doing Y can be conducted simultaneously within a single operation, and the resulting process will fall within the literal scope of the claimed process.

The term "DNA" refers to both biological DNA molecules and synthetic versions, such as made by nucleotide phosphoramidite chemistry, ligation chemistry or other synthetic organic methodologies. DNA, as used herein, also refers to molecules comprising chemical modifications to the bases, sugar, and/or backbone, such as known to those skilled in nucleic acid biochemistry. These include, but are not limited to, methylated bases, adenylated bases, other epigenetically marked bases, thiol modified bases, and non-standard or universal bases such as inosine or 3-nitropyrrole, or other nucleotide analogues, or ribobases, or abasic sites, or damaged sites. DNA also refers expansively to DNA analogues such as peptide nucleic acids (PNA), locked nucleic acids (LNA), and the like, including the biochemically similar RNA molecule and its synthetic and modified forms. All these biochemically closely related forms are implied by the use of the term DNA, in the context of the data storage molecule used in a DNA data storage system herein. Further, the term DNA herein includes single stranded forms, double helix or double-stranded forms, hybrid duplex forms, forms containing mismatched or non-standard base pairings, non-standard helical forms such as triplex forms, and molecules that are partially double stranded, such as a single-stranded DNA bound to an oligo primer, or a molecule with a hairpin secondary structure. Generally as used herein, the term DNA refers to a molecule comprising a single-stranded component that can act as the template for a polymerase enzyme to synthesize a complementary strand therefrom.

DNA sequences as written herein, such as GATTACA, refer to DNA in 5' to 3' orientation, unless specified otherwise. For example, GATTACA as written herein represents the single stranded DNA molecule 5'-G-A-T-T-A-C-A-3'. In general, the convention used herein follows the standard convention for written DNA sequences used in the field of molecular biology.

The term "polymerase" refers to an enzyme that catalyzes the formation of a nucleotide chain by incorporating DNA or DNA analogues, or RNA or RNA analogues, against a template DNA or RNA strand. The term polymerase includes, but is not limited to, wild-type and mutant forms of DNA polymerases, such as Klenow, *E. Coli* Pol I, Bst, Taq, Phi29, and T7, wild-type and mutant forms of RNA polymerases, such as T7 and RNA Pol I, and wild-type and mutant reverse transcriptases that operate on an RNA template to produce DNA, such as AMV and MMLV.

The term "dNTP" refers to both the standard, naturally occurring nucleoside triphosphates used in biosynthesis of DNA (i.e., dATP, dCTP, dGTP, and dTTP), and natural or synthetic analogues or modified forms of these, including those that carry base modifications, sugar modifications, or phosphate group modifications, such as an alpha-thiol modification or gamma phosphate modifications, or the tetra-, penta-, hexa- or longer phosphate chain forms, or any of the aforementioned with additional groups conjugated to any of the phosphates, such as the beta, gamma or higher order phosphates in the chain. In general, as used herein, "dNTP" refers to any nucleoside triphosphate analogue or modified form that can be incorporated by a polymerase enzyme as it extends a primer, or that would enter the active pocket of such an enzyme and engage transiently as a trial candidate for incorporation.

The terms, "binary data" or "digital data" refers to data encoded using the standard binary code, or a base 2 {0,1} alphabet, data encoded using a hexadecimal base 16 alphabet, data encoded using the base 10 {0-9} alphabet, data encoded using ASCII characters, or data encoded using any other discrete alphabet of symbols or characters in a linear encoding fashion.

The term, "digital data encoded format" refers to a series of binary digits, or other symbolic digits or characters that come from the primary translation of DNA sequence features used to encode information in DNA, or the equivalent logical string of such classified DNA features. In some aspects, information to be archived as DNA may be translated into binary, or may exist initially as binary data, and then this data may be further encoded with error correction and assembly information, into the format that is directly translated into the code provided by the distinguishable DNA sequence features. This latter association is the primary encoding format of the information. Application of the assembly and error correction procedures is a further, secondary level of decoding, back towards recovering the source information.

The term, "distinguishable DNA sequence features" means those features of a data-encoding DNA molecule that, when processed by a sensor polymerase, produce distinct signals that can be used to encode information. Such features may be, for example, different bases, different modified bases or base analogues, different sequences or sequence motifs, or combinations of such to achieve features that produce distinguishable signals when processed by a sensor polymerase.

The term, a "DNA sequence motif" refers to both a specific letter sequence or a pattern representing any member of a specific set of such letter sequences. For example, the following are sequence motifs that are specific letter sequences: GATTACA, TAC, or C. In contrast, the following are sequence motifs that are patterns: G[A/T] A is a pattern representing the explicit set of sequences {GAA, GTA}, and G[2-5] is a pattern referring to the set of sequences {GG, GGG, GGGG, GGGGG}. The explicit set of sequences in the unambiguous description of the motif, while such pattern shorthand notations as those are common compact ways of describing such sets. Motif sequences such as these may be describing native DNA bases, or may be describing modified bases, in various contexts. In various contexts, the motif sequences may be describing the sequence of a template DNA molecule, and/or may be describing the sequence on the molecule that complements the template.

The term, a "data-encoding DNA molecule," or "DNA data encoding molecule," refers to a molecule synthesized to encode data in DNA, or copies or other DNA derived from such molecules.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

The invention claimed is:

1. A microfluidic system for synthesizing nucleic acid, the microfluidic system comprising:

a microfluidic reactor; having an upstream side and a downstream side;

a first microfluidic reactor valve fluidically coupled to the upstream side;

a second microfluidic reactor valve fluidically coupled to the downstream side;

a plurality of chambers, each chamber configured to contain a reagent at a pressure above atmospheric pressure;

a plurality of microfluidic inlets, each microfluidic inlet corresponding to a respective chamber of the plurality of chambers;

a plurality of reagent valves, each reagent valve controllable to provide a reagent droplet size of a corresponding reagent from the respective chamber;

a gas source configured to provide a pressurized gas at a pressure above atmospheric pressure and propel reagent droplets to the microfluidic reactor.

2. The microfluidic system of claim 1 and further comprising a mixing microfluidic channel coupled to the upstream side and configured to receive reagents, mix the reagents and provide the mixed reagents to the microfluidic reactor.

3. The microfluidic system of claim 2 wherein the microfluidic reactor comprises a first plurality of laminated ceramic sheets and the mixing microfluidic channel comprises a second plurality of laminated ceramic sheets.

4. The microfluidic system of claim 1 wherein the microfluidic reactor comprises multiple laminated ceramic sheets.

5. The microfluidic system of claim 3 wherein the first plurality of laminated ceramic sheets comprises a first plurality of laser etched and stacked Low Temperature Co-Fired Ceramic (LTCC) plates and the second plurality of laminated ceramic sheets comprises a second plurality of laser etched and stacked Low Temperature Co-Fired Ceramic (LTCC) plates.

6. The microfluidic system of claim 1 and further comprising a controller coupled to control the reagent valves to control reagent droplet size.

7. The microfluidic system of claim 6 wherein the controller is further configured to control flow of the gas from the gas source.

8. The microfluidic system of claim 7 wherein the gas comprises a dry inert gas and the pressure of the gas source is at least twice atmospheric pressure.

9. The microfluidic system of claim 1 wherein the microfluidic reactor is a chamber having an elliptical shape having a long axis and a short axis.

10. The system of claim 9 wherein the chamber comprises an input and a first output disposed on opposite sides of the long axis.

* * * * *